United States Patent Office 3,335,188
Patented Aug. 8, 1967

3,335,188
BIS(ALKYLSULFONYL)ETHYLENES AND
PROCESS OF PREPARING SAME
Marvin L. Oftedahl, Crestwood, Mo., assignor to Monsanto Company, St. Louis, Mo., a corporation of Delaware
No Drawing. Filed July 31, 1964, Ser. No. 386,750
10 Claims. (Cl. 260—607)

This invention relates to a novel group of organic chemical compounds. More particularly, this invention is concerned with certain 1,1-bis(alkylsulfonyl) substituted styrenes which have been found to be useful in the control of bacterial and fungal organisms. In addition, this invention is concerned with a new and improved process for preparing such styrenes and other 1,1-bis(alkylsulfonyl) 2-substituted ethylenes.

A number of 1,1-bis(alkylsulfonyl) 2-substituted ethylenes are shown in the art. U.S. Patent 2,641,594 shows vinylidene bis(alkylsulfones) and the preparation thereof by the acid-catalyzed thermal decomposition of 1,1,3,3-tetrakis(alkylsulfonyl)propanes. More recently, in Rec. Trav. Chim., vol. 78, pages 354–363 (1959), a different method is taught for preparing the corresponding propenylidene, octenylidene and styrene compounds. There, orthothioesters were first subjected to an acid-catalyzed elimination of alkyl mercaptans. This was followed by a peracid oxidation of the resulting ketene dialkylthioacetal to produce the desired 1,1-bis(alkylsulfonyl) 2-substituted ethylene. In these known methods of preparation, a significant disadvantage resides in the fact that the needed reactants are neither readily available nor easily prepared.

It is accordingly an object of this invention to provide a new and improved method for the production of 1,1-bis(alkylsulfonyl) 2-substituted ethylenes.

It is a further object of this invention to provide such a method wherein the reactants employed are either generally available or simply prepared.

Still another object of this invention is the preparation of a novel group of said compounds wherein the substituted ethylenes are styrenes.

Other and different objects, advantages and features of the invention will become apparent upon consideration of the following detailed description thereof, especially when taken in conjunction with the attendant illustrative examples.

It has been found that the substituted ethylenes of this invention can be prepared by reacting a bis(alkylsulfonyl)-methane with an aldehyde. The reaction is carried out in the presence of a catalytic amount of a salt of an organic base and an organic acid. The reactants are heated, preferably in an inert organic solvent, and water which forms is trapped. The 1,1-bis(alkylsulfonyl) 2-substituted ethylenes which are obtained as reaction products have the formula,

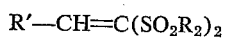

wherein R represents lower alkyl (the term "lower," as employed herein, designating those alkyl groups having up to six carbon atoms), and R' represents a member selected from the group consisting of alkyl of up to ten carbon atoms, phenyl, and mono-, di- and tri-substituted phenyl, the substituents being selected from the group consisting of chlorine, bromine, nitro and trifluoromethyl.

The reaction of this invention can be illustrated by the following equation:

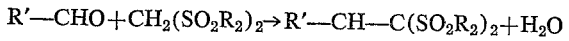

wherein the starting aldehydes which are employed include propionaldehyde, butyraldehyde, caproaldehyde, caprylaldehyde, capraldehyde, benzaldehyde, m-trifluoromethylbenzaldehyde, 2,4-dibromobenzaldehyde, 3,4-dinitrobenzaldehyde, 2,4,6-trichlorobenzaldehyde and the like.

The salts used in the practice of this invention can be characterized as organic acid salts of ammonia and organic bases having an ionization constant of at least about $10^{-5}$. Such bases include aminoethylalcohol ($K=2.77\times10^{-5}$), diethylamine ($K=9.6\times10^{-4}$), ethylenediamine ($K=8.5\times10^{-5}$), methylpyrrolidine ($K=1.5\times10^{-4}$), piperidine ($K=1.6\times10^{-3}$) and triethylamine ($K=5.65\times10^{-4}$). The acids which form the desired salts are the saturated and the mono-olefinically unsaturated monocarboxylic acids having up to about eighteen carbon atoms. Exemplary acid of this type include acetic, butyric, octanoic, lauric, stearic, acrylic, crotonic, hexenoic, tetradecenoic and oleic.

As noted above, the salts are employed in catalytic amounts, and such amounts are generally from about 0.005 mol to about 0.1 mol of salt per mol of reactants. Typical salts which are used include ammonium acetate, ethylenediamine diacetate, triethylamine acetate, piperidine acetate, diethanolamine acetate, piperidine butyrate, diethylamine laurate, dipropylamine acrylate, piperidine oleate and the like.

The inert organic solvents which are employed in the practice of this invention include aromatics such as benzene, toluene, the isomeric xylenes, the chlorobenzenes and the like, and the alkanes having boiling points of at least about 100° C. such as octane, 2-methylheptane, 3,4-dimethylhexane, 2,2,4-trimethylpentane and the like. The reaction is generally carried out at about the reflux temperature of the system, and the solvents used are those which serve to remove the water which forms during the reaction. In this respect, the above-mentioned aromatics are particularly preferred.

The invention will be more fully understood by reference to the following specific examples. The examples, however, are given solely for purposes of illustration, and are not to be construed as limiting the scope of the present invention in any way.

Example 1

A suitable reaction vessel is charged with 5.3 grams (0.05 mol) of benzaldehyde, 10.0 grams (0.05 mol) of bis(ethylsulfonyl)methane and 100 ml. of toluene. A catalytic amount of piperidine acetate is added, and the reaction solution is heated at reflux temperature for about 18 hours. During this period, about 1.1 ml. of water is collected in a Dean-Stark trap attached to the reaction vessel. The resultant reaction mixture is freed of toluene at reduced pressure. An oil which is obtained is dissolved in boiling isopropanol and then allowed to crystallize. The product is recrystallized from isopropanol to yield β,β-bis(ethylsulfonyl)styrene as white plates, M.P. 96–97° C.

Example 2

Following the procedures set forth in Example 1, 8.7 grams of m-trifluoromethylbenzaldehyde and 12.8 grams of bis(butylsulfonyl)methane are employed in 100 ml. of p-xylene. A catalytic amount of ethylenediamine diacetate is added, and the product obtained is β,β-bis(butylsulfonyl)-m-trifluoromethylstyrene.

Example 3

Again following the procedures set forth in Example 1, 5.3 grams of benzaldehyde, 11.4 grams of bis(propylsulfonyl)-methane, 100 ml. of toluene and a catalytic amount of ammonium acetate are employed. The product obtained is β,β-bis(propylsulfonyl)styrene.

Example 4

A suitable reaction vessel is charged with 7.5 grams (0.05 mol) of p-nitrobenzaldehyde, 10.0 grams (0.05 mol) of bis(ethylsulfonyl)methane, 100 ml. of toluene and a catalytic amount of piperidine acetate. The reaction mixture is heated at reflux temperature for about 18 hours, and water is collected in a Dean-Stark trap during this period. The resulting mixture is cooled and filtered to remove any unreacted bis(ethylsulfonyl)methane. The filtrate is evaporated, and the residue is recrystallized twice from isopropanol. There is obtained β,β-bis(ethylsulfonyl)-p-nitrostyrene as light orange plates, M.P. 180–181° C.

*Example 5*

Following the procedures set forth in Example 4, 15.6 grams of bis(hexylsulfonyl)methane is substituted for the bis(ethylsulfonyl)methane. The product obtained is β,β-bis(hexylsulfonyl)-p-nitrostyrene.

*Example 6*

Again following the procedures set forth in Example 4, 12.0 grams of 2,4,5-trinitrobenzaldehyde is substituted for the p-nitrobenzaldehyde. There is obtained β,β-bis-(ethylsulfonyl)-2,4,5-trinitrostyrene.

*Example 7*

Again following the procedures set forth in Example 4, 4.4 grams (0.025 mol) of 3,4-dichlorobenzaldehyde, 5.0 grams (0.025 mol) of bis(ethylsulfonyl)methane, 100 ml. of toluene and a catalytic amount of piperidine acetate are employed. The residue is crystallized from ethanol and recrystallized from isopropanol to yield β,β-bis(ethylsulfonyl)-3,4-dichlorostyrene as white crystals, M.P. 121–122° C.

*Example 8*

Again following the procedures set forth in Example 4, 6.6 grams of 3,5-dibromobenzaldehyde, 5.0 grams of bis-(ethylsulfonyl)methane, 100 ml. of isooctane and a catalytic amount of piperidine oleate are employed. The product obtained is β,β-bis(ethylsulfonyl)-3,5-dibromostyrene.

*Example 9*

Again following the procedures set forth in Example 4, benzene is substituted for the toluene, and diethylamine butyrate is substituted for the piperidine acetate to yield β,β-bis(ethylsulfonyl)-p-nitrobenzaldehyde.

*Example 10*

A suitable recation vessel is charged with 6.4 grams (0.05 mol) of octyl aldehyde, 10.0 grams (0.5 mol) of bis(ethylsulfonyl)methane, 100 ml. of toluene and a catalytic amount of piperidine acetate. The mixture is heated at reflux temperature for about 18 hours, and water is collected in a Dean-Stark trap during this period. The solvent is then removed at reduced pressure, leaving a brown liquid. Said liquid is distilled at reduced pressure (0.1 mm.); the residue is then filtered, and the filtrate is further distilled at said reduced pressure. There is obtained 1,1-bis(ethylsulfonyl)-1-nonene as a viscous yellow liquid.

*Example 11*

Following the procedures set forth in Example 10, 3.6 grams of butyraldehyde is substituted for the octyl aldehyde to yield 1,1-bis(ethylsulfonyl)-1-pentene.

As noted above, the substituted styrenes prepared by the process of this invention are novel, and such compounds have the formula,

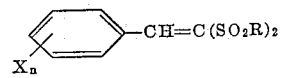

wherein R represents lower alkyl, n is an integer from 1 to 3, and X is selected from the group consisting of chlorine, bromine, nitro and trifluoromethyl. The utility of such novel compounds is demonstrated by the substituted styrene of Example 7 which is found to control the growth of *Aspergillus niger* at a dilution ten times greater than the maximum effective dilution of the corresponding unsubstituted styrene of Example 1.

While the invention has been described herein with regard to certain specific embodiments, it is not so limited. It is to be understood that variations and modifications thereof may be made by those skilled in the art without departing from the spirit and scope of the invention.

The embodiments of the invention in which an exclusive property or privilege is claimed are defined as follows:

1. A compound of the formula,

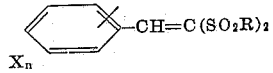

wherein R represents lower alkyl, n is an integer from 1 to 3, and X is selected from the group consisting of chlorine, bromine, nitro and trifluoromethyl.

2. β,β-bis(ethylsulfonyl)nitrostyrene.
3. β,β-bis(ethylsulfonyl)trifluoromethylstyrene.
4. β,β-bis(ethylsulfonyl)dichlorostyrene.
5. A process for preparing a compound of the formula, $R'—CH=C(SO_2R)_2$, wherein R represents lower alkyl of and R' is selected from the group consisting of alkyl of up to ten carbon atoms, phenyl, and mono-, di- and tri-substituted phenyl, the substituents being selected from the group consisting of chlorine, bromine, nitro and trifluoromethyl, said process comprising heating bis(lower alkylsulfonyl)methane and an aldehyde of the formula $R'—CHO$, where R' has the same meaning as above, said heating being carried out in the presence of a catalytic amount of an organic acid salt of a base, said base being selected from the group consisting of ammonia and organic bases having an ionization constant of at least about $10^{-5}$, said acid being selected from the group consisting of saturated and mono-olefinically unsaturated monocarboxylic acids of up to eighteen carbon atoms.

6. A process as defined in claim 5 wherein said heating is at about the reflux temperature of the system.

7. A process as defined in claim 5 wherein said heating is carried out in the presence of an inert organic solvent.

8. A process as defined in claim 5 wherein said salt is present in an amount of from about 0.005 mol to about 0.1 mol per mol of reactants.

9. A process as defined in claim 7 wherein said solvent is selected from the class consisting of benzene, toluene, xylene, chlorobenzene and alkane having a boiling point of at least about 100° C.

10. A process as defined in claim 7 wherein said salt is piperidine acetate and said solvent is toluene.

No references cited.

CHARLES B. PARKER, *Primary Examiner.*

DELBERT R. PHILLIPS, *Assistant Examiner.*